United States Patent [19]
Huston

[11] Patent Number: 6,146,575
[45] Date of Patent: Nov. 14, 2000

[54] APPARATUS AND METHOD FOR PLASTICIZATION AND EXTRUSION EMPLOYING AN ORBITAL SCROLL

[75] Inventor: David Robert Huston, Rosemont, Canada

[73] Assignee: Husky Injection Molding Systems Ltd., Bolton, Canada

[21] Appl. No.: 09/245,870

[22] Filed: Feb. 8, 1999

[51] Int. Cl.⁷ .............................. B29B 7/34; B29C 45/46
[52] U.S. Cl. .......................... 264/349; 366/96; 366/315; 366/325.3; 418/55.1; 425/270; 425/582
[58] Field of Search .............................. 264/349, 328.17, 264/328.19, 176.1; 425/200, 204, 207, 209, 582, 580, 585; 366/99, 325.3, 339, 303, 244, 315, 317, 96–98; 418/55.1, 55.2

[56] References Cited

U.S. PATENT DOCUMENTS

| | | |
|---|---|---|
| 2,324,168 | 7/1943 | Montelius . |
| 3,226,766 | 1/1966 | Von Zelewisky et al. . |
| 3,248,755 | 5/1966 | Plymale . |
| 3,600,114 | 8/1971 | Dvorak . |
| 3,689,181 | 9/1972 | Maxwell . |
| 4,201,481 | 5/1980 | Iddon et al. . |
| 4,439,042 | 3/1984 | Bertoglio . |
| 5,200,204 | 4/1993 | Horton et al. . |
| 5,458,471 | 10/1995 | Ni . |

*Primary Examiner*—Jill L. Heitbrink
*Attorney, Agent, or Firm*—Gowling Lafleur Henderson

[57] ABSTRACT

An extruder for plasticizing and extruding a material. The extruder is formed from two interfitted orbital scroll members. Material, usually in a solid state, can be fed between the scroll members. As the scroll members are rotated eccentrically with respect to one another, the material is conveyed toward the center of the scroll members within a pocket of ever decreasing volume. This applies shear energy to the material which causes melting. Heaters can be provided in the scroll members to further aid and control the melting. By the time the material reaches the central output, it is in a molten state and can be extruded through an output. A method for extruding, and an injection molding machine using such an extruder to plasticize plastic resin, such as PET, is also described.

21 Claims, 9 Drawing Sheets

UNEVEN WAVE SURFACE FOR GREATER MIXING

FIG. 15

TRUCK TYRE SURFACE

FIG. 14

WAVE SURFACE

FIG. 17

APPARATUS AND METHOD FOR PLASTICIZATION AND EXTRUSION EMPLOYING AN ORBITAL SCROLL

FIELD OF THE INVENTION

The present invention relates to plasticization and extrusion. In particular, the present invention relates to an apparatus and method for plasticization and extrusion of materials, such as plastic resins and thixotropic metals, employing an orbital scroll.

BACKGROUND OF THE INVENTION

Beverage containers, and the like are commonly made by blow molding a parison, or preform, that is made from polyethylene teraphthalate (PET) material. Such PET reheat and blow preforms are commonly manufactured in an injection molding machine. Injection molding machines are typically equipped with a hopper that contains particulate thermoplastic polymer resin, usually in pellet form. The resin particles are fed to an extruder where they melt under the application of thermal and shear energy. The resulting molten resin is then fed to an injection nozzle and injected into a mold. Once the molded resin has set, or frozen, the resulting plastic article is ejected from the mold, and the process repeats.

Extruders, also called plasticizers, are well known to those of skill in the field of injection molding. Generally, the hopper feeds the inlet end of a plasticizing screw which is encased in a heated barrel of constant diameter. Helical flights on the screw convey the particles along the screw where the mass of particles are compressed and rub against the heated barrel surface. This action provides frictional heating as well as some heat conducted from the barrel. However, the bulk of the energy imparted by the screw to the particles is the result of shear. The particles are sheared between two surfaces, the root diameter of the screw and the inner diameter of barrel, which move with respect to each other. The heat generated by this shearing action increases along the length of the barrel as the screw root increases in diameter closer to the outlet end of the screw, so that a homogeneous melted mass of the plastic polymer material is produced.

In a reciprocating screw type of injection molding machine, the polymer material accrues in the space beyond the discharge end of the screw. When a predetermined amount of material has accumulated, the screw stops its rotation. It then serves as a plunger, moving forward and forcing a desired quantity of the polymer melt, or a "shot", through the injection nozzle and into a mold or molds with one or more cavities. The polymer melt cools in these cavities and the finished molded articles are ejected from the mold or molds.

In a two stage or pre-plasticizing injection system the role of the plasticizing or extruder screw is restricted to melting the material, with the injection of the molten plastic into the injection mold accomplished by a separate shooting pot and injection plunger or piston system.

Prior art extruders have a number of well known disadvantages. The design of extruder screws is a complex art. The ratio of length to diameter of the screw and barrel, and the speed with which the screw can be rotated, are restricted by a number of factors, including plasticizing rates, residence time in the extruder between shots, and shear sensitivity of the particular polymer material. This can limit the throughput of the extruder and prevent significant reductions in cycle time for the injection molding process. Further, increasing the speed of transfer of the melt usually exposes the melt to high shear rates due to resistance to the flow of the melt. Excessive and uncontrollable shear rates, and their related heating effect on the melt contribute to the formation of degradation products. The predominant degradation product generated during standard processing of PET is acetaldehyde. Its presence in molded objects such as beverage bottles, water bottles and food containers and the like is very deleterious from a taste standpoint, even at very low concentration levels. Consequently, an important focus of optimization in the plasticizing screw is the reduction of polymer degradation while maintaining melt output. In addition, control of heating in screw plasticizers is problematic. Generally, zone heating is provided along the barrel, but this is a somewhat crude technique and even heating throughout the melt is difficult to achieve.

From a physical standpoint, the size of the extruder is often the main determining factor in the size of an injection molding machine. While it is clearly desirable from an industry perspective to reduce the footprint of injection molding machines, the length of barrel required to fully plasticize the polymer material translates into increased floor space requirements. Furthermore, barrel maintenance and change is a slow and labourious process with the prior art extruders.

U.S. Pat. No. 5,200,204 describes a rotary plasticizing system that dispenses with a screw. Instead, the particulate polymer material is fed into an annular space between a rotor and a barrel. Eccentric rotation of the rotor within the barrel imparts shear energy to the polymer material causing the material to melt. Heating can also be provided along the length of the barrel. While this rotary extruder is more compact than the typical screw extruder, its relatively low throughput, and the difficulties in adapting it to production molding applications, has hampered its adoption in the injection molding industry.

Extruders are also employed in related molding fields. For example, thixotropic materials, such as magnesium, melted in an extruder and fed into a suitable mold. As used herein, plasticization is defined to include the transformation of any material from a solid state to a flowable, or moldable, state under the application of thermal and/or shear energy, and is not limited to the plasticization and/or extrusion of polymer plastic resins.

As is well known in the unrelated heating and refrigeration field, compressors are a common component used to compress the refrigerant fluid to extract heat from the system. Compressors are usually either reciprocating compressors that use a reciprocating piston to compress the fluid, or scroll compressors. Generally, scroll compressors employ two interfitted involute scroll members. One of the scroll members is stationary, while the other orbits eccentrically about the stationary member. The refrigerant is introduced into a pocket formed at the outer edge between the two scroll members. Provided the two scroll members are restrained from rotating relative to each other, as the orbiting scroll traces its path, the refrigerant is moved to the center of the enmeshed scroll members, while being simultaneously compressed as the size of the pocket is continuously reduced. Though well known for nearly a century, the elegant scroll compressor has been limited to refrigeration and gas compression applications using compressible fluids such as freon.

It is, therefore, desirable to provide a novel extruder for plasticizing and extruding material that can occupy less space, and provide improved control of melt characteristics, such as evenness of heating through the melt.

SUMMARY OF THE INVENTION

In a first embodiment of the present invention, there is provided an extruder, comprising:

- a housing having an input and an output for an extrudable material;
- at least one scroll unit having a stationary scroll member fixedly mounted within the housing; an orbital scroll member rotatably mounted within the housing and interfitted with the stationary scroll member at an angular offset; and at least one pocket for containing the extrudable material, the at least one pocket formed between opposing wraps of the stationary scroll member and the orbital scroll member; an outer edge of the scroll unit communicating with the input, and a central portion of the scroll unit communicating with the output;
- a drive for eccentrically rotating the orbital scroll member within the stationary scroll member to convey the at least one pocket toward the central portion to reduce the volume of the at least one pocket, and extrude the material at the output.

In a further embodiment of the present invention, there is provided a method for extruding a material, comprising the steps of:

(i) capturing the material within a pocket formed between a stationary scroll and an orbital scroll;

(ii) driving the stationary and orbital scrolls relative to one another to convey the material toward an output and reduce the volume of the pocket;

(iii) extruding the material through the output.

In further aspects, the method of the present invention can include heating and mixing the material as it is conveyed to the output.

In a further embodiment of the present invention, there is provided a method for plasticizing a material, comprising the steps of:

(i) feeding the material to a scroll extruder having a pair of involute scroll members;

(ii) introducing the material between opposing faces of the pair of involute scroll members;

(iii) driving the involute scroll members in an eccentric orbital motion to provide shear energy to the material;

(iv) providing thermal energy to the material to melt the material in conjunction with the shear energy;

(v) conveying the material from the scroll extruder.

In a further embodiment of the present invention, there is provided an injection molding machine for forming plastic articles from a plastic material, comprising:

- a source of plastic material in a solid form;
- an extruder for melting the solid plastic material, the extruder comprising at least one scroll unit having a stationary scroll member fixedly mounted within a housing; an orbital scroll member rotatably interfitted with the stationary scroll member at an angular offset; and at least one pocket for containing the plastic material, the at least one pocket formed between opposing wraps of the stationary scroll member and the orbital scroll member; drive means for eccentrically rotating the orbital scroll member within the stationary scroll member to continuously propel the at least one pocket towards a central portion of the scroll unit to continuously reduce the volume of the at least one pocket, and produce shear energy in the plastic material to melt the material; input means communicating with the source and the at least one pocket, and an output communicating with the central portion to output the molten plastic material;
- a mold cavity downstream of the output
- injection means communicating with the output to receive the molten plastic material and inject a predetermined portion of the molten plastic material into the mold cavity.

In further aspects of the injection molding machine of the present invention, the source of the solid plastic material is a hopper, and the injection means can include a hot runner system, shooting pot, nozzle assembly, and valve gate assembly.

In a further embodiment of the present invention, the extruder of the present invention is provided with heating means, such as heating elements in the stationary scroll member.

BRIEF DESCRIPTION OF THE DRAWINGS

Preferred embodiments of the present invention will now be described, by way of example only, with reference to the attached Figures, in which.

DETAILED DESCRIPTION

Figure 1:
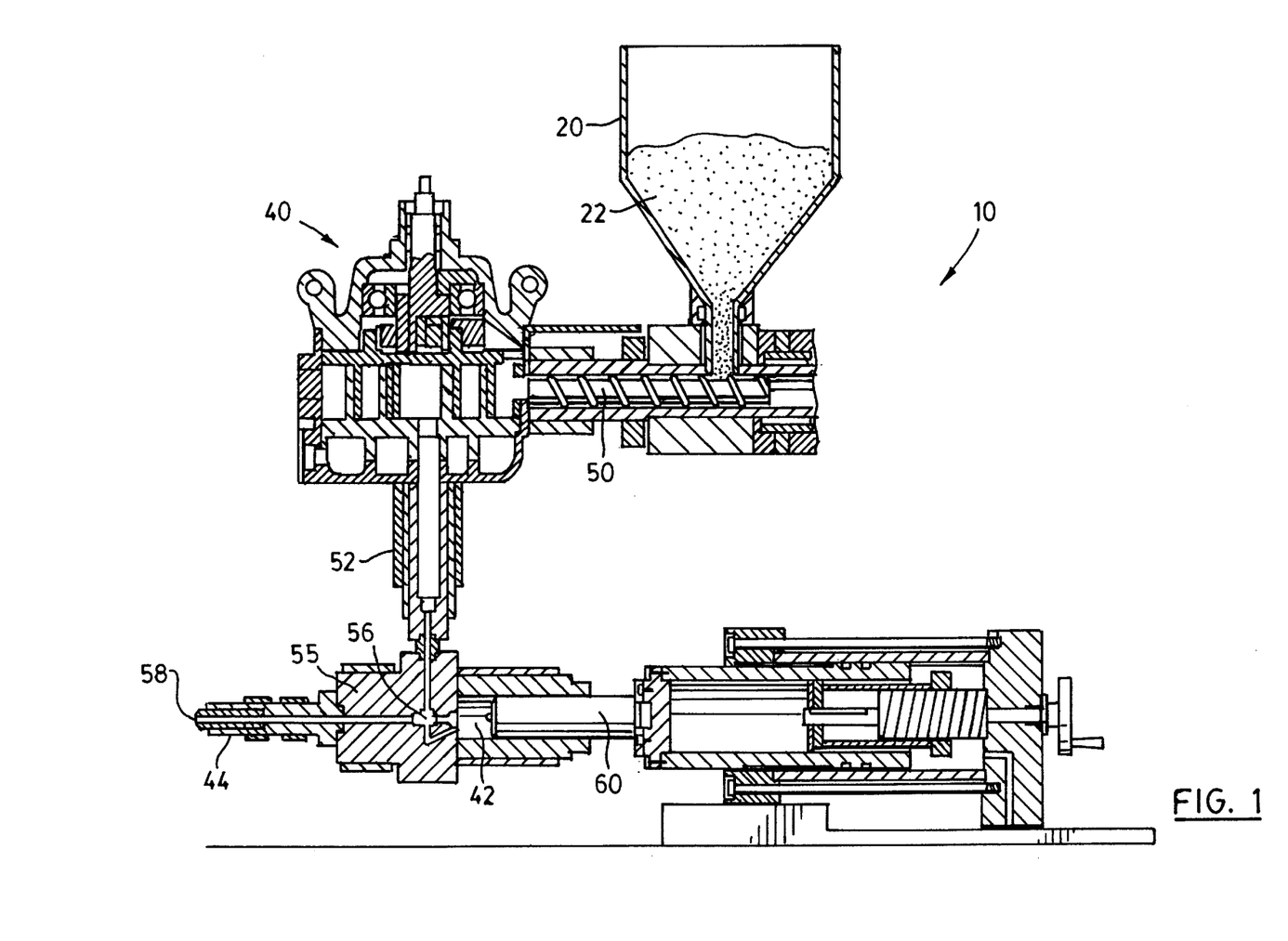
FIG. 1 shows a cross section of a portion of an injection molding machine according to an embodiment of the present invention.

An embodiment of a two stage injection molding machine according to the present invention, generally referenced at 10, is shown in FIG. 1 in cross section. The present invention will be described with reference to injection molding of plastic polymer resin, but as will be appreciated by those of skill in the art, the present method and apparatus for plasticization and extrusion can be applied to any material that is extruded under pressure and any machine therefor. Similarly, the present invention can be applied to any material that is melted under the application of thermal and/or shear energy, and subsequently extruded.

Injection-molding machine 10 generally comprises a source, shown here as hopper 20, feeding granular, or particulate, plastic material 22 to a scroll extruder 40. The plastic material 22 is plasticized, or melted, in scroll extruder 40. In a preferred embodiment of the present invention, the plastic material consists of polyethylene teraphthalate, or PET. The resulting molten plastic material, also known as the melt, is fed to an injection means, typically a shooting pot 42. And, in each cycle of the injection molding machine 10, the shooting pot 42 is activated to inject the melt into a mold cavity (not shown), through a nozzle assembly 44 where a plastic article is formed.

In the illustrated embodiment, plastic material 22 is fed from a hopper 20 to scroll extruder 40 by rotating screw 50 that acts as an auger to convey the plastic material 22. A similar hopper and auger (not shown) feed material to an opening 45 at the opposite side of extruder 40, as will be more fully described below. As will be understood by those of skill in the art, auger 50 can be replaced by any suitable feed means, such as a direct gravity feed, or a gas blower to feed material 22 to the extruder 40. Suitable control means are provided by the manufacturer of the molding machine 10 to control the rate at which plastic material 22 is plasticized, depending on the particular molding application.

Extruder 40 melts the material 22 by the application of shear and other energies, as will be described in detail below. From extruder 40, the molten plastic material is fed to a collecting cavity 52 that, in turn, communicates with a distributor 55 via a distributor or melt valve 56. Distributor valve 56 is rotatable between an open position, in which passageways provided in the distributor 55 and the valve 56 provide fluid communication between collecting cavity 52 and shooting pot 42, and a closed position, wherein shooting pot 42 is in fluid communication with a nozzle 44 whose injection orifice 58 is blocked when the mold is open.

The volume of the melt accumulated before injection into the mold is controlled by an injection plunger 60 which closes one end of shooting pot 42. In the present invention, injection plunger 60 is moved by an injection piston (not shown) via hydraulic, electric or other means (also not shown), and the maximum volume of shooting pot 42 is controlled by the movement of this injection piston.

After injection of the shooting pot contents, the shooting pot 42 is again ready to receive plasticized material from the extruder 40. Distributor valve 56 is opened by a control means and, substantially simultaneously, the melt is transferred from collecting cavity 52 to shooting pot 42. Back pressure relief, as is well known to those skilled in the fabrication and design of injection molding machines, can be provided to permit a certain volume of plasticized material to accumulate between shots.

Figure 2:
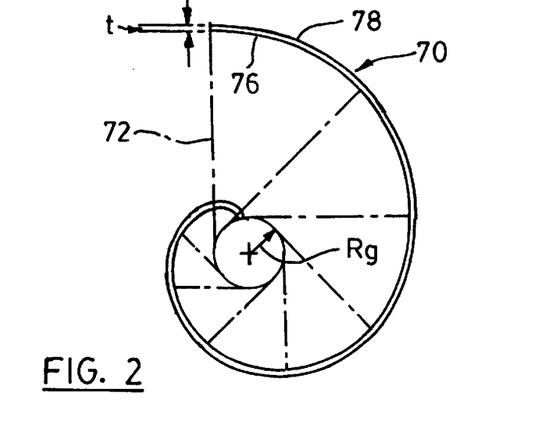
FIG. 2 shows a generalized scroll member in cross section.
Figure 3:
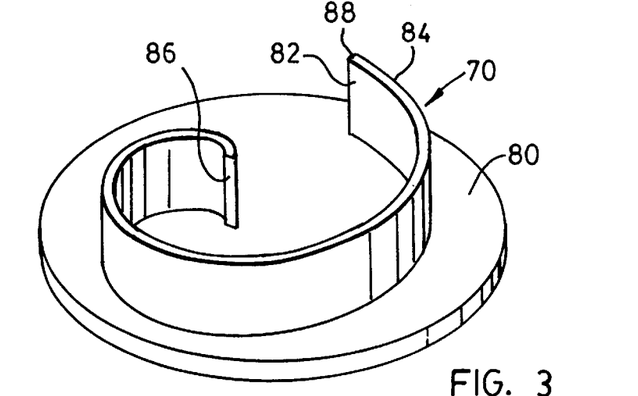
FIG. 3 shows a perspective view of the scroll member of FIG. 2 mounted on an end plate.

The scroll extruder 40 of the present invention will be better understood by first discussing the general concepts underlining involute spiral scrolls. As shown in FIGS. 2 and 3, an involute scroll 70 is generated by unwrapping line 72 from around the circumference of a generating circle 74 having a radius Rg. The line 72, which can be visualized as a string held at a fixed point, traces out the interior spiral involute curve 76, as shown. If the tracing is stopped at any point, the line formed by the string, called a swing radius line, is never the same length as it would be if stopped at any other point during the unwinding. Several equally spaced swing radius lines are shown in FIG. 2. To form scroll member 70 with a thickness t, a congruent outer involute spiral curve 78 is generated by regenerating the same spiral with a line that is longer than line 72 by an amount t.

Referring to FIG. 3, a complete involute scroll member 70 is shown in perspective mounted on a disc shaped end plate 80. Inner and outer surfaces of scroll 70 member, termed inner and outer wraps 82 and 84, run from an inner edge 86 to an outer edge 88. For the purposes of illustration, scroll 70 covers only one turn, or 360 degrees, from inner edge 86 to outer edge 88. In practice, scrolls generally cover more than one turn, usually at least one and a half turns.

Figure 4:
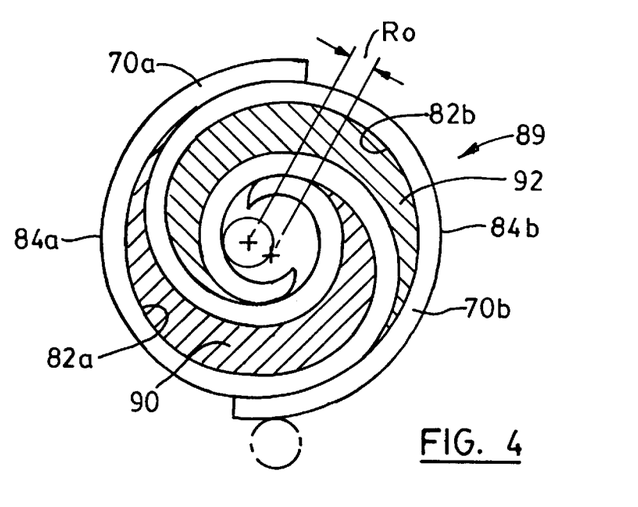
FIG. 4 shows a cross section of a two interfitted scrolls.

In FIG. 4, a scroll unit 89 is shown in cross section. Two identical scroll members of the general type described above, covering one and a half turns each, are indicated generally at 70a and 70b. Scrolls 70a and 70b are interfitted by reversing one scroll and axially fitting them together, followed by angularly offsetting them by 180 degrees and radially offsetting them by a distance Ro to create at least two, here four lines of contact between the juxtaposed inner and outer wraps 82a, 82b and 84a, 84b. The contact of scrolls 70a and 70b defines two pockets 90 and 92, indicated by shading. The distance Ro is defined as (P/2)–t, where P is the pitch of the scroll, which is equal to the circumference of the generating circle having radius Rg.

If one scroll member of scroll unit 89 is fixed while the other is eccentrically orbited about the axis of the fixed scroll with an orbit radius of Ro, all points on the orbiting scroll rotate in a circle of radius Ro. If, during orbiting, the scroll members 70a and 70b are prevented from rotating relative to each other, then the lines of contact will shift along the wrap surfaces continually inwardly, shrinking the pockets 90 and 92 continually inwardly and then reforming them at the rim of the outer rim of the scrolls. Thus any material introduced into a pocket at the rim of scroll unit 89 is subject to a continually increasing pressure as it is moved continually toward the center.

Figure 5:
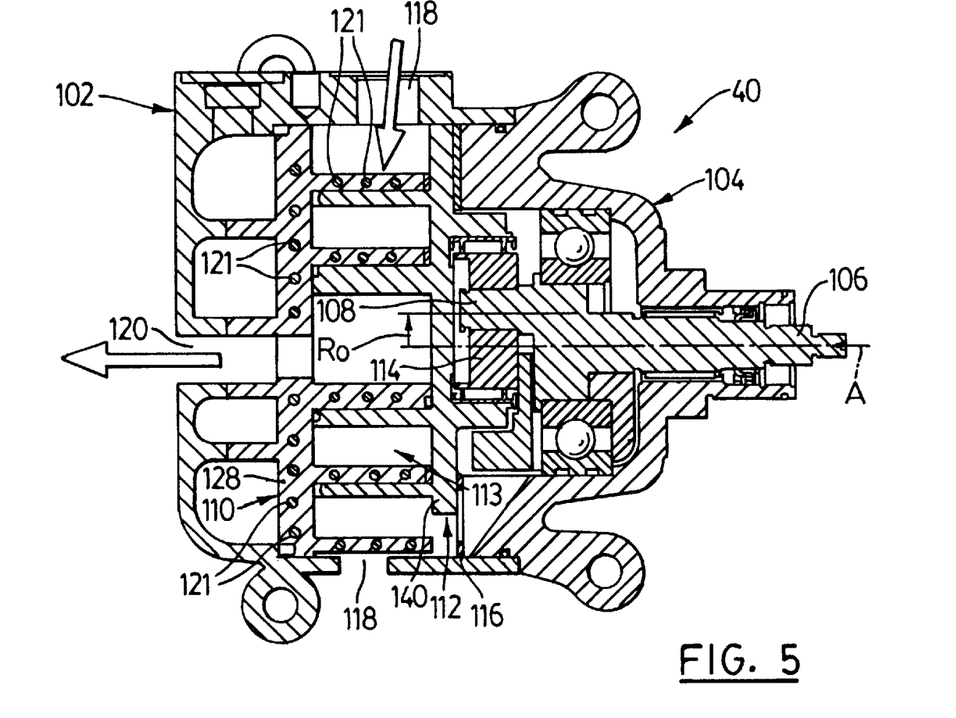
FIG. 5 shows a cross section of a plasticizer according to an embodiment of the present invention.

A scroll extruder 40 according to the present invention is shown in greater detail in the cross section of FIG. 5. Scroll extruder 40 has a generally cylindrical housing 102 that is closed by a head 104. A main drive shaft 106 is rotatably supported in head 104 and turns an eccentric pin 108 at a radial offset Ro relative to a main drive shaft axis A. A fixed, or stationary, scroll member 110 and an orbital scroll member 112 are interfitted together within housing 102 to form a scroll unit 113. Stationary scroll member 110 is secured immovably within housing 102, while orbital scroll member 112 is rotatably supported on eccentric pin 108 by a conventional eccentric bushing and counterweight assembly 114 that permits pin 108 to drive orbital scroll member 112 relative to stationary scroll member 110 with the relative radial offset Ro. Other drive mechanisms, as will occur to those of skill in the art, can be employed to drive orbital scroll 112. Supporting the thrust load as orbital scroll member 112 is driven is a flat thrust plate 116, captured between the back of orbital scroll member 112 and head 104. Input channels 118 for receiving particles of a polymer material, such as PET resin pellets, are formed on opposite sides of housing 102, adjacent the interfitted scroll members. An output channel 120 is also formed in housing 102, such that plasticized resin can exit extruder 40, as will be more fully described below. Heating and/or cooling means, such as heating elements 121, or fluid filled cooling channels (not shown), can be provided to control the supply of thermal energy to the plastic material being plasticized. Due to practical engineering considerations, heating elements 121, which can be any suitable electrical or other element, are generally located within stationary scroll member 110, however, heating can also be provided in either of the orbital scroll member 112 or the housing 102. Separately controlled heating can be provided in separate zones, or portions, of either scroll member. As will be appreciated by those of skill in the art, this permits localized control of the heat of the melt as it progresses through extruder 40.

Figure 6:
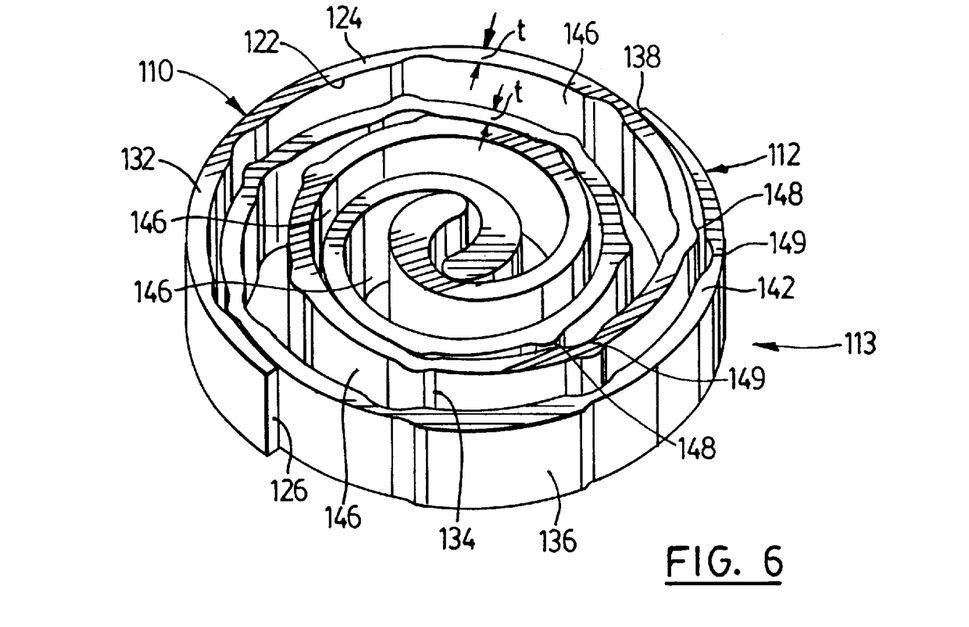
FIG. 6 shows a perspective view of the interfitted scroll members of the plasticizer of FIG. 5.

Referring to FIGS. 5 and 6, each scroll member 110, 112 is a essentially an involute spiral that is generated as described above. Stationary scroll member 110 has congruent inner and outer wraps 122 and 124, separated by a constant thickness t, and covering two turns, or 720 degrees, terminating at an outer edge 126. Stationary scroll member 110 is mounted on an end plate 128. An end edge 132 axially bounds the wraps 122, 124. The configuration of orbital scroll member 112 is generally identical. Orbital scroll member 112 has inner and outer wraps 134 and 136, separated by the same thickness t, that cover two turns to end at an outer edge 138. An end plate 140, and end edge 142, complete the orbital scroll member 112. To interfit scroll members 110 and 112 and form scroll unit 113, the orbital scroll member 112 is reversed, rotated by 180 degrees, offset by offset radius Ro, and inserted into stationary scroll member 110. Once interfitted, end plates 128 and 140 enclose the scroll members 110 and 112, and a series of pockets 146 formed between the scroll members 110 and 112.

As discussed above, it is necessary to provide scroll members 110 and 112 with some kind of anti-rotation mechanism to prevent relative rotation between the members when orbital scroll member 112 rotates, and maintain the desired angular offset between the scroll members. For example, it is known in scroll compressor art to use mechanical devices such as an Oldham ring, an example of which is described in U.S. Pat. No. 4,484,869, or a ball coupling mechanism, an example of which is described in U.S. Pat. No. 5,366,360. In the embodiment of the present invention illustrated herein, an integral anti-rotation means is provided, similar to that described in U.S. Pat. No. 5,591,022. Essentially, ridges 148 formed on the surface of the outer wraps 124, 136 cooperate with troughs 149 formed on the surface of inner wraps 122, 134 to prevent slippage of the scroll members 110, 112 relative to one another as orbital scroll member 112 orbits. The present invention is not limited to any particular anti-rotation mechanism, and it is contemplated the choice of anti-rotation mechanism will depend on various factors, such as space requirements, material to be processed, etc., as can be determined by those of skill in the art.

Figure 7:
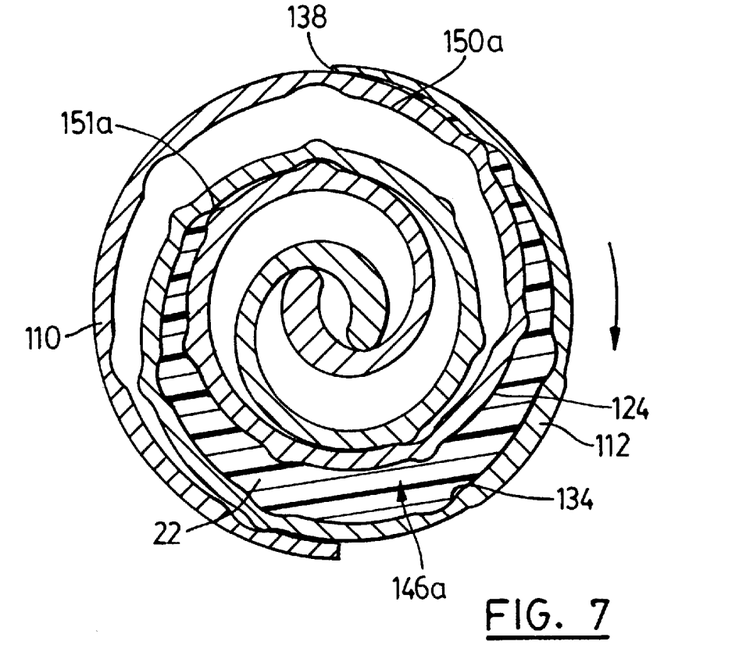
FIGS. 7 through 12 show cross sectional views of the scroll members shown in FIG. 6, showing the progressive compression and movement of polymer material within a pocket formed between the scroll members as the orbiting scroll traces one orbiting cycle.
Figure 8:
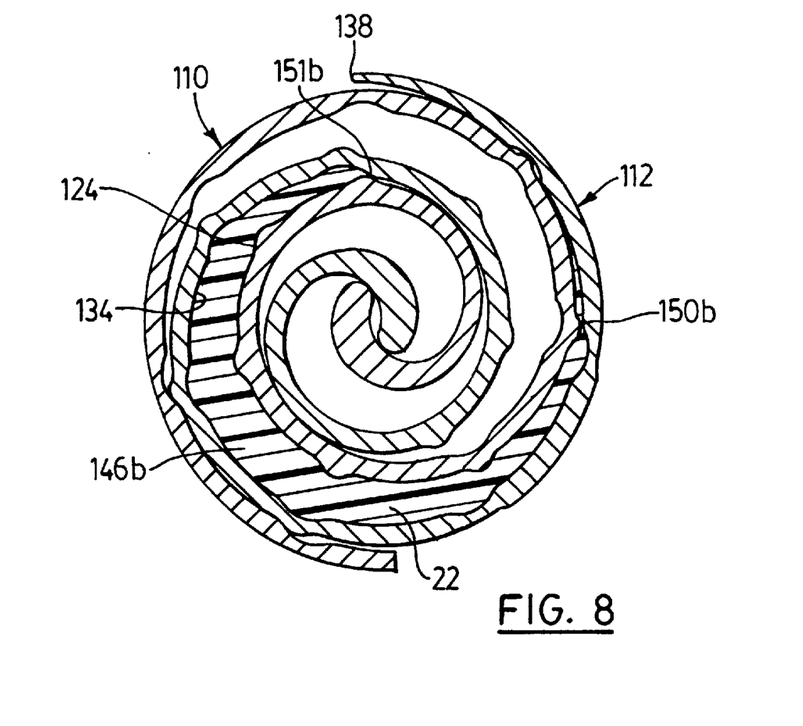

Referring to FIGS. 7 through 12, the general operation of extruder 40 can be understood. FIGS. 7 through 12 are cross sectional views of interfitted scroll members 110 and 112 as orbiting scroll member 112 completes one orbital cycle in a clockwise direction. For ease of explanation, the figures show a single pocket 146 of plastic material 22, at six different stages "a" through "f" during the cycle, as it progresses from the outer edge of the interfitted scroll members 110, 112 towards the center. FIG. 7 shows the beginning of the cycle. A pocket 146a is formed between the inner wrap 134 of the orbital scroll member 112 and the outer wrap 124 of the stationary scroll member, between points of contact 150a and 151a. Orbital scroll member 112 is rotating at a constant rate. As orbital scroll member 112 rotates to the position shown in FIG. 8, the points of contact between inner wrap 134 and outer wrap 124 translate to points 150b and 151b. Because of the continuously decreasing radius of the scroll members, points 150b and 151b are closer together than points 150a and 151a. Consequently, the cross sectional area of pocket 146b is reduced relative to packet 146a, and plastic material 22 is compressed into a correspondingly smaller volume, and thereby subjecting the plastic particles to shear forces that create heat to begin melting plastic material 22.

As orbital scroll member 112 continues to rotate to the positions shown successively in FIGS. 9 through 12, the contact point pairs move closer together from 150b–151b, to 150c–151c, to 150d–151d, to 150e–151e, and finally to 150f–151f. The pocket size correspondingly decreases from 146b to 146c to 146d to 146e and, finally, to 146f, thus subjecting the plastic material 22 contained therein to ever increasing pressures due to ever decreasing pocket volume, shear forces, and thermal energy from heating elements 121. This engenders continuously increased heating of the plastic material 22 as it travels towards the central portion of the scroll unit 113, and results in a molten material as the pocket arrives at the center.

Figure 9:
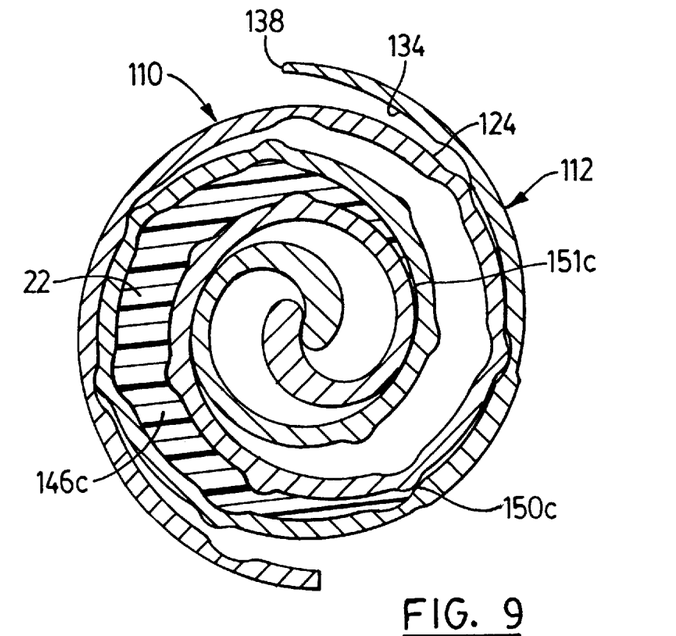
Figure 10:
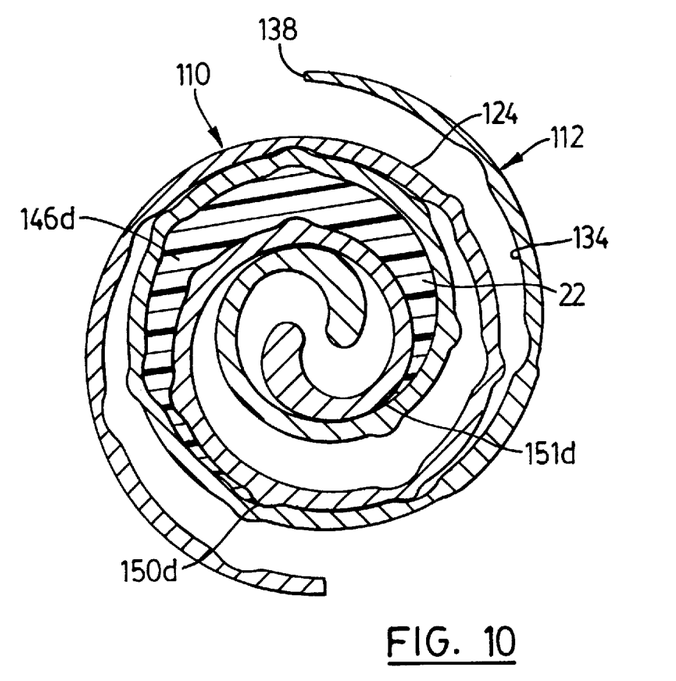
Figure 11:
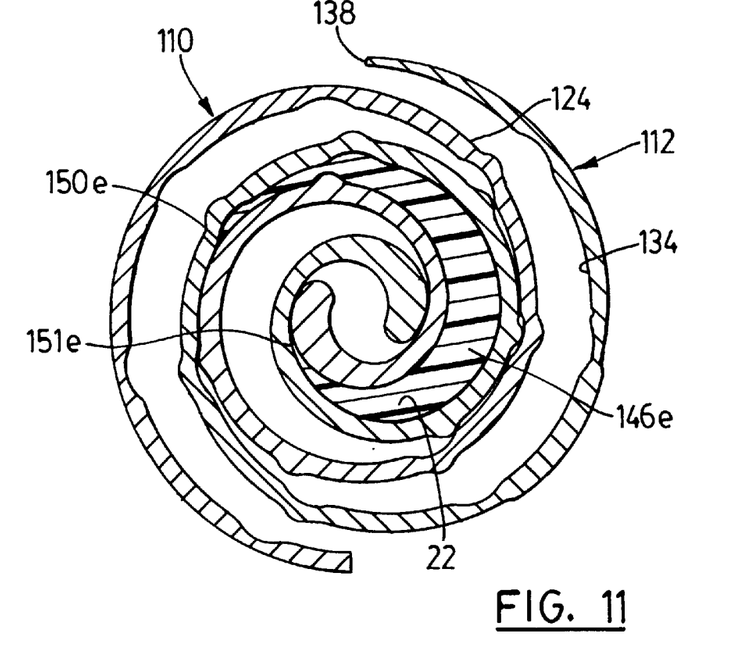
Figure 12:
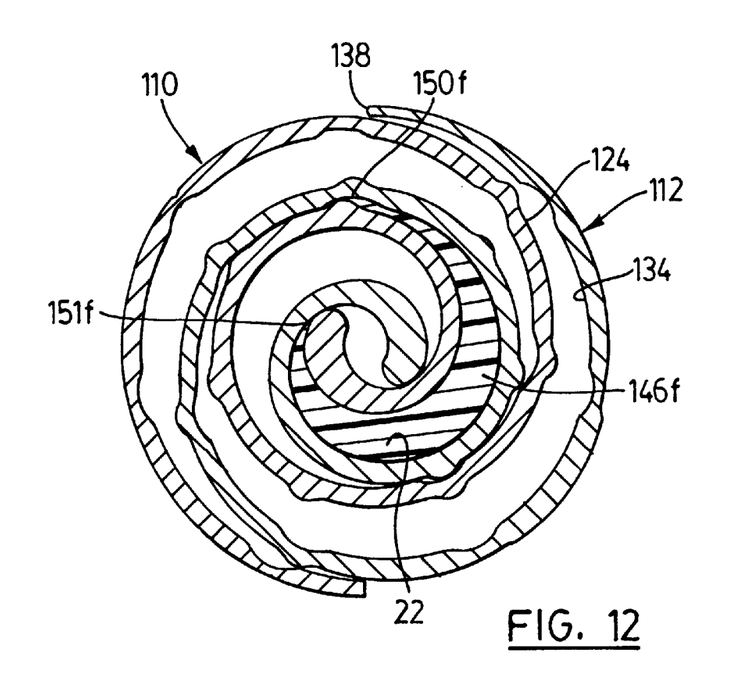

Returning to FIG. 5, it can be seen that, as the now molten plastic material 22 moves towards the center of scroll unit 113, it will come into communication with outlet channel 120. Since the molten plastic is under pressure, it will flow out of channel 120 to collecting cavity 52, shown in FIG. 1. Meanwhile, as best seen in FIGS. 9, 10 and 11, as orbital scroll member 112 rotates through the second half of its rotation, end 38 lifts from the outer wrap 124 creating an open ended pocket 146' that can receive more particulate plastic material conveyed from hopper 20. The orbital rate of orbital scroll 112 can be varied to create a pulsed output, if desired.

To further intensify the melting of the plastic material, additional heating can be introduced into the melt heating elements 121. Heating elements 121 can be controlled to provide concentrated heat to the melt at certain points along the pocket path, or they can provide constant heat along the length of the path travelled by the pocket.

As will be apparent from an examination of FIGS. 7 through 12, in actual operation, all the pockets 146 formed between opposing wraps of the stationary and orbital scroll members 110, 112 will contain plastic material in some state, and the solid plastic material will be fed to opposing edges of the scroll unit 113 from opposing inputs 118 which are generally aligned with ends 126 and 138. In this manner, a substantially continuous flow of molten plastic material is supplied to output 120.

As will be apparent to those of skill, in addition to shear forces, the plastic material within a pocket 146 is also subject to frictional forces and heat, and is constantly mixed as it travels toward the center. Together, the shear and frictional energy introduced in to the melt, and the mixing action, can contribute to provide a substantially homogeneous melt. The speed and reduced path length over which plasticization occurs and the fine control of heating characteristics provided by heating/cooling elements 121 limits the creation of harmful degradation products, such as AA, commonly found in screw extruders.

Figure 13:
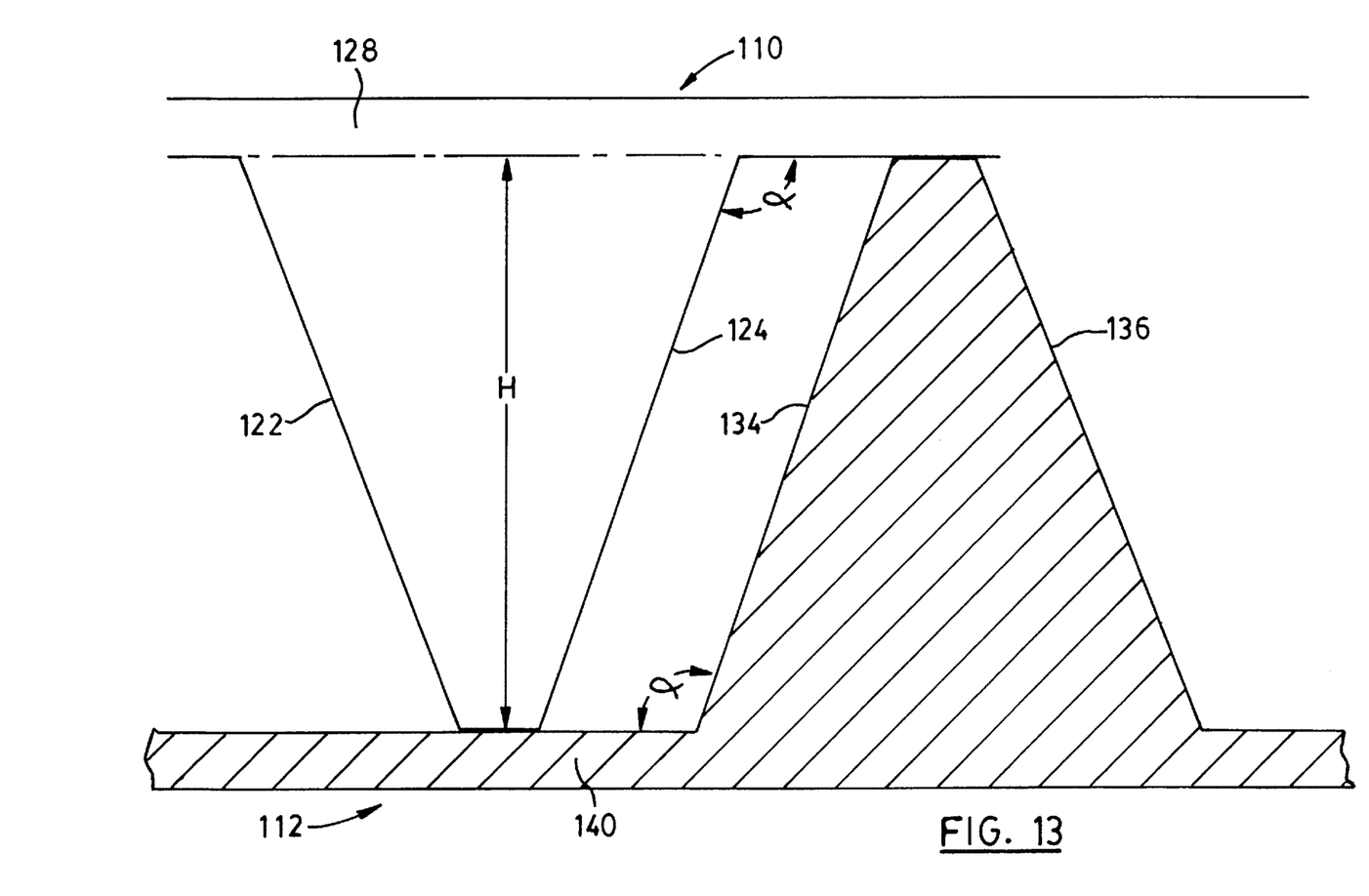
FIG. 13 shows an axial cross section of an embodiment of the scroll members, showing an alternative scroll geometry.

Several variables can be controlled to determine the state of the molten material at the output. These include the orbital sweep, orbital rate, degree of sealing between the interfitted scrolls, scroll wrap height, scroll geometry, scroll heating and number of turns. For example, in further embodiments of the present invention, the geometry and surface characteristics of the scroll members 110, 112 can be modified to control the mixing action and provide greater contact between the wraps of the scroll members and the plastic material for heating or cooling. For example, an alternative geometry for scroll members 110 and 112 is shown in FIG. 13. The scroll members, shown in profile mounted to end plates 128 and 140, respectively, have a generally truncated, triangular profile, tapering from a wide base to a narrower tip thereby inclining the wraps 124 by an angle $\alpha$. Varying the height and angle of inclination $\alpha$ of the scroll members varies the surface area of the wraps in contact with the plastic material. As will be apparent, an increased surface area affect the heat transfer to and from the plastic material and can influence the mixing of the plastic material as it travels over the wrap surface. The geometry of the scroll members can vary along its length if desired. A "barrier" extruder can also be provided, where mixing fins as previously described can be configured to separate the melt from unmelted solids as the material progresses through the extruder.

Figure 14:
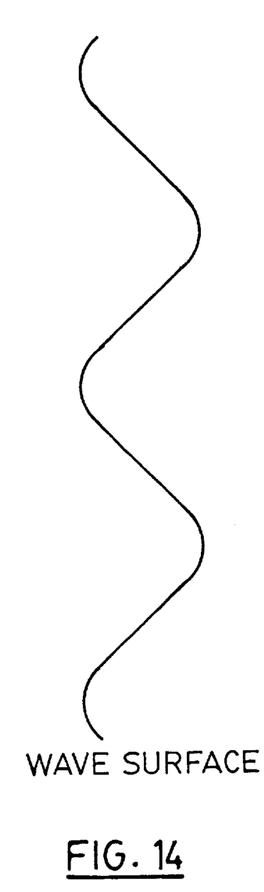
FIGS. 14 through 16 show plane views of surface patterns that can be applied to scroll members of the present invention.
Figure 15:
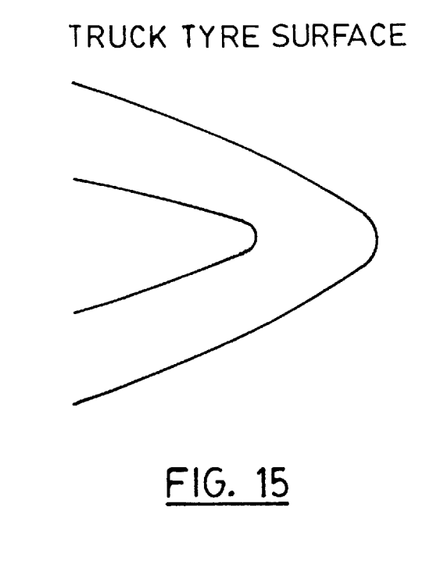
Figure 16:
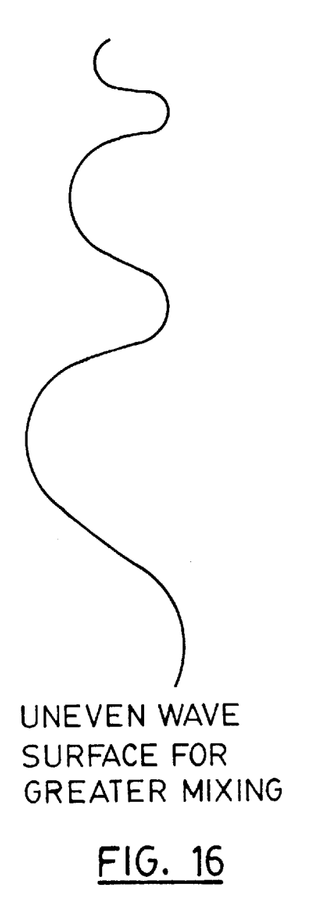

It is also possible to vary the mixing characteristics of the extruder 40, by applying surface effects to the wrap surfaces. Three examples of such surface effects are shown in FIGS. 14 to 16: a wave pattern, a "tire groove" pattern, and an uneven wave pattern. These surface effects can be applied in a repeating pattern the length of the scroll, or just along certain sections of the wrap, to increase turbulence in the melt, and hence the mixing that the melt undergoes as it travels over the patterned surface. The particular scroll geometry and/or surface effects chosen for a particular plasticizing application will depend largely on the material to be plasticized and other processing factors.

Figure 17:
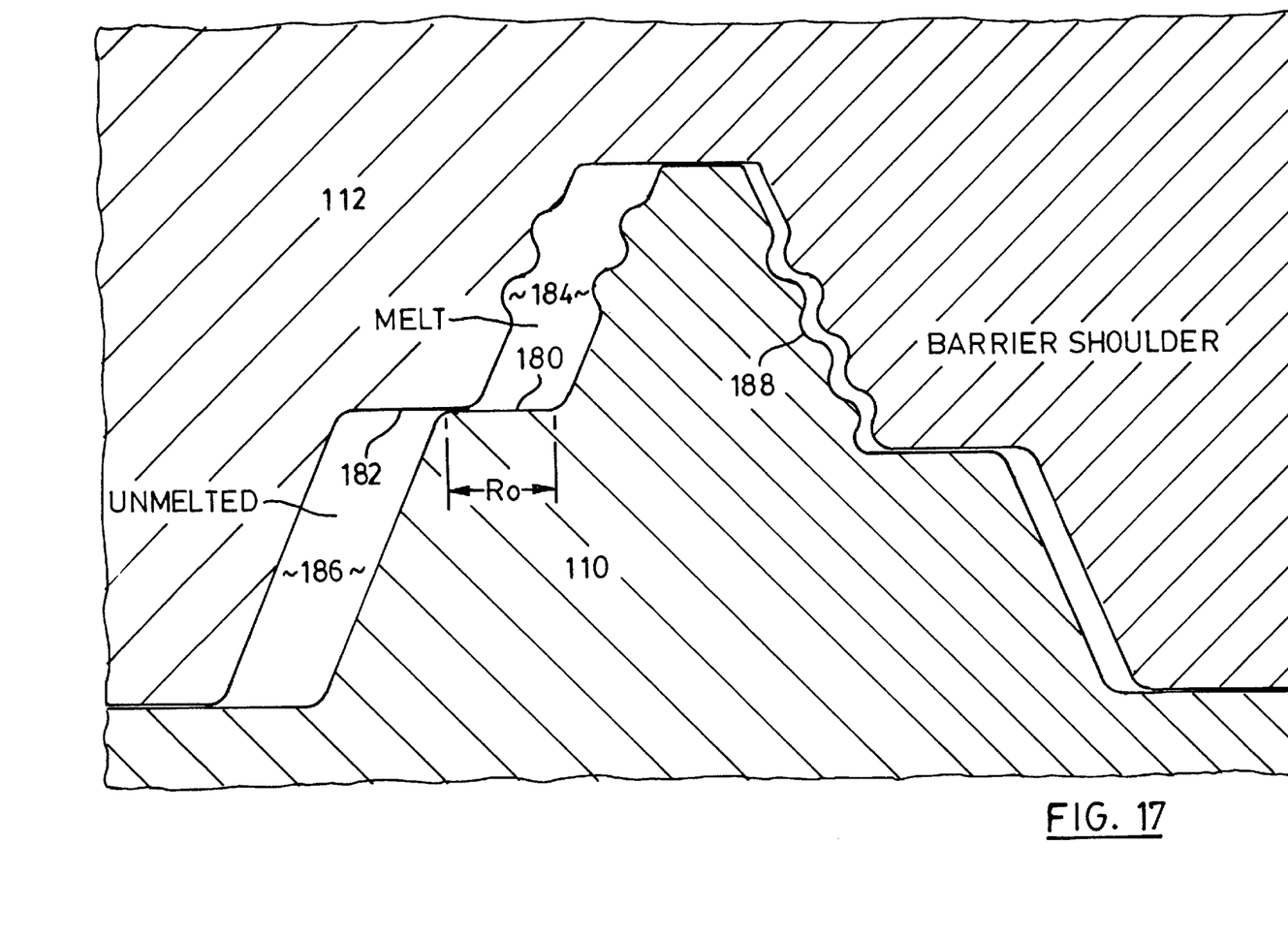
FIG. 17 shows a cross section of a barrier extruder according to the present invention.

FIG. 17 shows a particular profiled embodiment of the scroll extruder that provides a "barrier" extruder. As is well known to those of skill in the art, a barrier extruder separates the melt from unmelted material. A shoulder 180 in the form of a step is formed on the stationary scroll member 110, and a complementary shoulder 182 is formed on orbital scroll member 112. The shoulders 180, 182 wrap around the scroll wraps in a helical form, down from the top, thereby creating an upper volume 184, and a lower volume 186. As the material is conveyed to the output, the upper volume 184, containing the melted material is ever increasing in size, while the lower volume 186, containing the unmeleted material, is ever decreasing. Mixing contours 188, or profiles, can again be provided to mix the material as it melts to ensure even a homogeneous melt. It is presently contemplated that the limit on the shoulder should be nearly as large as the orbital radius Ro.

The extruder of the present invention has a number of advantages over the prior art, particularly screw extruders. The extruder 40 of the present invention provides significant size reduction over screw extruders, by replacing the screw and barrel with a compact unit that plasticizes radially instead of longitudinally. This size reduction has a number of benefits, including decreased material costs and a reduced footprint for the injection molding machine, which translates directly to increased profitability for users who can free up floor space to additional machines or other purposes. The decreased size also makes it easier to associate multiple extruders, processing multiple plastic materials, for multi-material molding. Previously, the size of the extruders could make some such setups cost prohibitive and unwieldy.

The concentric and compact design of the scroll extruder provides more uniform heating to the melt, and better control of specific heat zones. Consequently, less shear energy is needed to plasticize the material, reducing the formation of degradation by products such as AA. The flexibility in scroll geometry design provides further opportunities for controlling the heating of the melt, while applying surface effects to the wrap surfaces can improve mixing and melt homogeneity.

Maintenance costs are also reduced for an injection molding machine of the present invention. When a extruder needs to be replaced it is easily accessible, and it is a simple matter to remove it from the machine and insert another in its place. By contrast, changing a barrel or a screw in a conventional extruder is a time consuming and difficult process that can result in significant downtime for an injection molding machine undergoing extruder maintenance. It is also expected that the scroll extruder of the present invention will be less subject to wear than prior art screw extruders due to less shear.

It will be apparent to those skilled in the art that the foregoing is by way of example only. Modifications, variations and alterations may be made to the described embodiments without departing from the scope of the invention which is defined solely in the claims.

I claim:

1. A method for extruding a material, comprising the steps of:
   (i) capturing the material within a pocket formed between a stationary scroll and an orbital scroll;
   (ii) driving the stationary and orbital scrolls relative to one another to convey the material toward an output and reduce the volume of the pocket;
   (iii) extruding the material through the output.

2. A method according to claim 1, wherein the material melts as the volume of the pocket reduces.

3. A method according to claim 1, further including a step of heating the material as it is conveyed to the output.

4. A method according to claim 3, wherein the stationary scroll is provided with heating means.

5. A method according to claim 1, further including a step of mixing the material as it is conveyed to the output.

6. A method for plasticizing a material, comprising the steps of:
   (i) feeding the material to a scroll extruder having a pair of involute scroll members;
   (ii) introducing the material between opposing faces of the pair of involute scroll members;
   (iii) driving the involute scroll members in an eccentric orbital motion to provide shear energy to the material;
   (iv) providing thermal energy to the material to melt the material in conjunction with the shear energy;
   (v) conveying the material from the scroll extruder.

7. A method according to claim 6, wherein step (v) includes conveying the material to a shooting pot.

8. An extruder, comprising:
   a housing having an input and an output for an extrudable material;
   at least one scroll unit having a stationary scroll member fixedly mounted within the housing; an orbital scroll member rotatably mounted within the housing and interfitted with the stationary scroll member at an angular offset; and at least one pocket for containing the extrudable material, the at least one pocket formed between opposing wraps of the stationary scroll member and the orbital scroll member; an outer edge of the scroll unit communicating with the input, and a central portion of the scroll unit communicating with the output;
   a drive for eccentrically rotating the orbital scroll member within the stationary scroll member to convey the at least one pocket toward the central portion to reduce the volume of the at least one pocket, and extrude the material at the output.

9. An extruder according to claim 8 further comprising heating means.

10. An extruder according to claim 9, wherein the heating means is heating elements provided in the stationary scroll member.

11. An extruder according to claim 9, wherein the heating means is provided within fluid channels in the stationary scroll member.

12. An extruder according to claim 8, wherein the drive means includes a hydraulic drive.

13. An extruder according to claim 8, wherein the drive means include a DC motor.

14. An extruder according to claim 8, wherein the stationary and orbital scroll members are profiled to mix the material as it is conveyed to the output.

15. An extruder according to claim 14, wherein fins of the stationary and orbital scroll members are complementarily tapered.

16. An extruder according to claim 14, wherein at least one of the stationary and orbital scroll members is provided with a grooved face.

17. An extruder according to claim 14, wherein at least one of the stationary and orbital scroll members is provided with a profiled face.

18. An injection molding machine for forming articles from a material, comprising:

a source of material in a solid form;

an extruder for melting the solid material, the extruder comprising at least one scroll unit having a stationary scroll member fixedly mounted within a housing; an orbital scroll member rotatably interfitted with the stationary scroll member at an angular offset; and at least one pocket for containing the material, the at least one pocket formed between opposing wraps of the stationary scroll member and the orbital scroll member; drive means for eccentrically rotating the orbital scroll member relative to the stationary scroll member to continuously propel the at least one pocket towards a central portion of the scroll unit to continuously reduce the volume of the at least one pocket, and produce shear energy in the material to melt the material; input means communicating with the source and the at least one pocket, and an output communicating with the central portion to output the molten material;

a mold cavity downstream of the output;

injection means communicating with the output to receive the molten material and inject a predetermined portion of the molten material into the mold cavity.

19. An injection molding machine according to claim 18, wherein said material is a plastic resin.

20. An injection molding machine according to claim 19, wherein said plastic resin is polyethylene teraphthalate.

21. An injection molding machine according to claim 18, wherein said material is a thixotropic material.

\* \* \* \* \*